Patented May 12, 1942

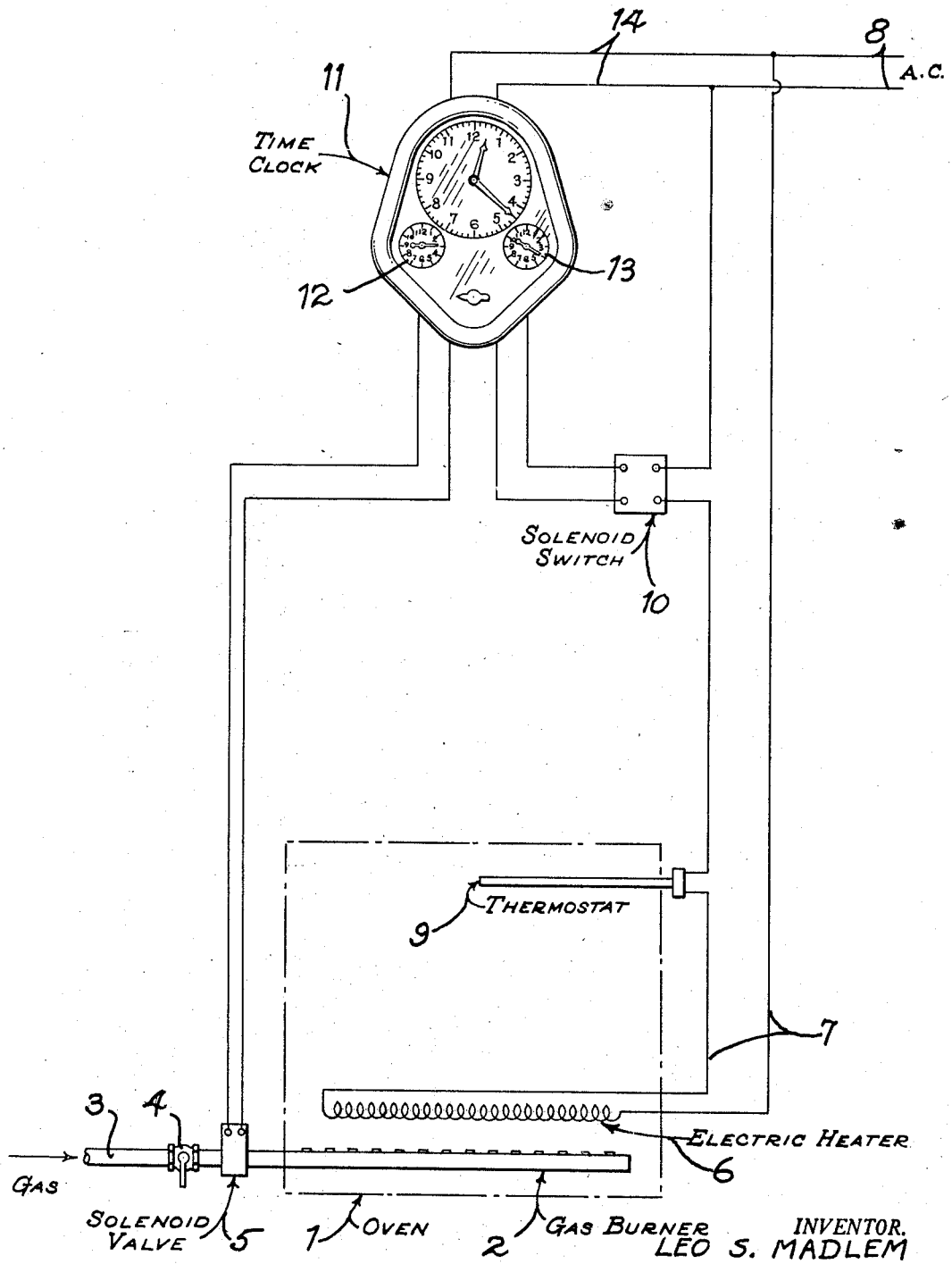

2,282,489

UNITED STATES PATENT OFFICE 2,282,489

OVEN HEATING SYSTEM

Leo S. Madlem, San Francisco, Calif.

Application June 15, 1938, Serial No. 213,853

1 Claim. (Cl. 236—46)

My invention relates to a system for heating ovens, and more particularly to a means for utilizing electricity to maintain the heat, in an oven preheated by gas.

The main object of my invention is to provide an oven which may be preheated by gas and maintained in temperature by electricity.

Another object of my invention is to provide a simple and efficient means for maintaining the temperature of an oven preheated by gas, by an electrical element of small current consumption.

A still further object of my invention is to provide an oven heating system which is economical for long time cooking.

Other objects of my invention will be apparent or will be specifically pointed out in the description forming a part of this specification, but I do not limit myself to the embodiment of the invention herein described, as various forms may be adopted within the scope of the claim.

My invention may be more fully understood by direct reference to the drawing, which is a diagram showing one preferred form of the heating system embodying my invention.

A cooking oven, as indicated by the broken line 1, is provided with the usual gas burner 2, supplied with gas through supply pipe 3, manual valve 4 and solenoid valve 5. The oven is also provided with an electric heating element 6 which is of small wattage, not sufficient to require any special wiring, and which can be plugged into any existing service outlet nearby.

Current leads 7 from the electric heater lead to the A. C. mains 8, and in series with the heating element is a thermostat 9 within the oven 1. Also placed in series with the heater and thermostat is a solenoid switch 10. A time clock 11 electrically controls both solenoid valve 5 in the gas line and solenoid switch 10 in series with the electric element. The time clock is of the usual variety easily obtainable in the trade for turning on or off various circuits, as determined by the setting of timing dials 12 and 13. The clock may be electrically driven by connection 14 from the mains 8.

In operation, solenoid valve 5 is normally open, as is solenoid switch 10. The manual valve 4 in the gas burner is opened and the gas burner 2 is lighted. After a predetermined time has elapsed, in accordance with the desired preheating temperature of the oven, the clock 11 operates, shutting off the gas by closing solenoid valve 5 and energizing the electric heating element 6 by closing solenoid switch 10. The cooking may then be continued under the heat from the electric heating element 6 only, the temperature of cooking to be maintained being regulated by the thermostat 9. If desired, the time clock 11 can be utilized to open solenoid switch 10 at such time as desired following predetermined time schedules for cooking different articles of food.

I am thus able, by operating the oven in the above described manner, to obtain fast preheating of the oven by means of the gas burner, and then to maintain prolonged cooking at the temperature attained during preheating, by means of the electric heater 6. The use of the latter, due to the fact that only a small amount of heat is required to maintain temperature in the oven, gives rise to economy of oven operation which cannot be obtained by the use of either gas or electricity alone.

Furthermore, it is well known that gas burners do not function well when turned very low and are always in danger of being blown out, whereas the maintaining temperature can easily be kept up by the low powered heating element.

It will also be obvious to those skilled in the art that the time clock may be entirely eliminated and a second thermostat substituted therefor. This auxiliary thermostat may be placed within the oven, and when the oven reaches a certain predetermined temperature the thermostat action can be utilized to close the solenoid valve 5 and to close the solenoid switch 10, as described above for the clock.

I claim:

In combination with a cooking oven, a gas burner and an electric heating element in said oven, means for supplying gas to said burner, said burner having a large heating capacity for quickly raising said oven and contents thereof to a desired cooking temperature, said electric heating element having only sufficient heating capacity to supply said oven with slightly more heat than is necessary to maintain it at said cooking temperature when attained, an electric circuit for supplying current to said electric heating element, a thermostat responsive to oven temperature for controlling said circuit, a time clock, means controlled by said time clock for shutting off said gas burner after a predetermined period of operation and simultaneously placing said electric heating element under control of said thermostat.

LEO S. MADLEM.